(12) United States Patent
Mindus (10) Patent No.: US 11,249,735 B2
(45) Date of Patent: Feb. 15, 2022

(54) SYSTEM FOR THE CREATION AND DEPLOYMENT OF MULTIPLATFORM APPLICATIONS

(71) Applicant: MINDUS S.A.R.L., Monaco (MC)

(72) Inventor: Christopher Mindus, Valbonne (FR)

(73) Assignee: MINDUS S.A.R.L., Monaco (MC)

( * ) Notice: Subject to any disclaimer, the term of this patent is extended or adjusted under 35 U.S.C. 154(b) by 204 days.

(21) Appl. No.: 16/300,972

(22) PCT Filed: May 12, 2017

(86) PCT No.: PCT/EP2017/061535
§ 371 (c)(1),
(2) Date: Aug. 25, 2020

(87) PCT Pub. No.: WO2017/194777
PCT Pub. Date: Nov. 16, 2017

(65) Prior Publication Data
US 2020/0394025 A1 Dec. 17, 2020

(30) Foreign Application Priority Data
May 12, 2016 (FR) ...................................... 1654272

(51) Int. Cl.
*G06F 9/455* (2018.01)
*G06F 9/50* (2006.01)
(Continued)

(52) U.S. Cl.
CPC ................ *G06F 8/38* (2013.01); *G06F 3/147* (2013.01); *G06F 3/1454* (2013.01); *G06F 8/60* (2013.01); *G06F 9/451* (2018.02); *G06F 3/04842* (2013.01)

(58) Field of Classification Search
CPC .... G06F 9/45558; G06F 9/5077; G06F 9/451; G06F 2212/657; G06F 3/067;
(Continued)

(56) References Cited

U.S. PATENT DOCUMENTS 8,359,391 B2 * 1/2013 Deen ................. H04L 29/12594
709/226
9,426,218 B2 * 8/2016 CaraDonna ......... G06F 16/2282
(Continued)

OTHER PUBLICATIONS

Haiming et al., Parallel File System-surpported Server Virtual Environment in Data Center, 4 pages (Year: 2010).*

(Continued)

*Primary Examiner* — Thuy Dao
(74) *Attorney, Agent, or Firm* — Hauptman Ham, LLP (57) ABSTRACT

A method and system for the creation and deployment of applications on several types of client devices, including a client application hosted on a client device, and a server hosting a main application, includes the main application including a logic part and a graphic part and a virtual module for storing a user interface designated as a panel space. The main application includes an interface selector configured to match a user interface type to each client device type and a virtual graphic interface management module designated as a virtual space. The virtual space: including a data communication module, is configured to allow communication between the logic part of the main application and the graphic part, is configured to permanently store the activation status of the main application following changes ordered by at least one of the client applications.

15 Claims, 5 Drawing Sheets

(51) Int. Cl.
   *H04L 29/08* (2006.01)
   *H04L 12/24* (2006.01)
   *H04L 12/911* (2013.01)
   *G06F 8/38* (2018.01)
   *G06F 9/451* (2018.01)
   *G06F 3/14* (2006.01)
   *G06F 3/147* (2006.01)
   *G06F 8/60* (2018.01)
   G06F 3/0484 (2013.01)

(58) Field of Classification Search
   CPC .... G06F 3/1454; G06F 3/147; G06F 3/04842; G06F 8/38; G06F 8/60
   See application file for complete search history.

(56) References Cited

U.S. PATENT DOCUMENTS

| | | |
|---|---|---|
| 2006/0123345 A1 | 6/2006 | Parimi |
| 2006/0179118 A1 | 8/2006 | Stirbu |
| 2008/0082603 A1 | 4/2008 | Mansour et al. |
| 2013/0339871 A1 | 12/2013 | Ramini |

OTHER PUBLICATIONS

International Search Report from corresponding International Application No. PCT/EP2017/061535, dated Aug. 2, 2017, pp. 1-3, European Patent Office, Rijswijk, The Netherlands.

* cited by examiner

SYSTEM FOR THE CREATION AND DEPLOYMENT OF MULTIPLATFORM APPLICATIONS

RELATED APPLICATIONS

The present application is a U.S. National Phase of International Application Number PCT/EP2017/061535, filed May 12, 2017, and claims the priority of French Application No. 1654272, filed May 12, 2016.

FIELD OF THE INVENTION

This invention relates in particular to a system and method for developing and deploying a universal application.

A preferred application is in the services industry using applications, specifically universal application development services.

TECHNOLOGICAL BACKGROUND

In the latter field, solutions are known for developing a universal application. That is, an application that can run on multiple platforms, that is, on multiple types of client devices. Applications are a very important market today. But the market is divided into several development and usage platforms. For example, computers and mobile devices each represent an independent platform. The computer platform includes several types of hardware and software. As a result, several developments are necessary for the application to be compatible with all the hardware on the computer platform. Independent development is also generally required for the application to work with different operating systems (Windows®, Mac OSX® or Linux®). The platform containing mobile devices includes all the smartphones (computer or smartphone) and digital tablets (touch tablet). These devices have different software and hardware architectures than computers. Mobile devices generally operate under specific operating systems. The best known are Android®, iOS® and Windows Phone® systems. Each of the computer and mobile device platforms, combined with the variety of operating systems that can be installed on them, requires a particular and unique development. Indeed, the differences in hardware (processor power, screen sizes, number of pixels, provision of specific sensors, presence of a touchscreen or not, etc.) and the differences in operating systems mean that it is necessary to develop a specific application for each platform, and more precisely for each operating system. Even within a given platform using a common operating system, there can be differences in applications to allow for the specifics of the hardware of the device on which the application will be installed. This is particularly the case for applications developed specially for touch tablets.

The solution found to avoid this time and repetitive development costs was to create web applications, i.e. applications on the Internet. Solutions in the earlier art take up this idea like US2006/179118. Indeed, by using applications on the Internet and in which only the interface is remoted to the client device used by a user, any client device with a web browser can use the application. This saves many application developments and facilitates updates. Although it is easy to implement, this solution nevertheless poses some problems. Indeed, adapting the application to the various equipment of the client devices and in particular to the screen size, or to the presence of touchscreens, is not optimal. Furthermore, the application may not be able to use all the features available in the client device, such as gyroscopes, microphones, cameras or any other tool available in an electronic device. Finally, the memory and battery consumption of the client device is not optimal.

Another solution developed to ease the development of multiplatform applications, i.e. on several types of client devices, was to code an application in a specific language and then compile the code in a language compatible with the targeted platform. This advantageous solution means that a single application can be developed then installed on all client devices, while taking advantage of all the features provided by the client device. However, the application developed will not be perfectly optimized for all client devices. In addition, when the said client devices (hardware and/or software) or the application are updated, it is necessary to specifically code the update for each type of client device on which the application is installed.

The invention solves all or part of the drawbacks of current techniques.

This essential feature offers a selection of the perfectly adapted graphic part with a client device while keeping only one development for the logic part. This saves a significant amount of coding time.

In addition, the separation of the graphic part into two subareas makes it possible to collectively manage all the graphic interfaces of the panel space thanks to the virtual space. The virtual space thus allows the creation of a "common language" allowing the logic part to process user data issued in incompatible languages.

The invention also concerns a system for creating and deploying applications on several types of client devices, including at least one client application hosted on at least one client device, and a server hosting at least one main application, said main application including a logic part and a graphic part.

Preferably, the graphic part of the main application is distributed between a virtual storage module of at least one user interface designated panel space and a virtual graphic interface management module designated the virtual space, the system being configured to perform at least the following steps in response to activation of the at least one client application, these steps being performed by at least one microprocessor:

- to transmit from the client device the said usage data to the panel space,
- to transmit from the panel space the said usage data to the virtual space,
- to send the usage data from the virtual space to the logic part,
- to have the logic part process the usage data,
- to transmit the usage data from the logic part to the virtual space with a status of processed data,
- to transmit from the virtual space the said usage data to the panel space,
- to transmit the processed data from the panel space to the at least one client application.

Accordingly, by the innovation of the invention, the main application functions as a virtual application hosted on a server. There is a single application and a single code that is preferably a Java code. The Java code is natively not compatible with all the client devices (e. g. incompatible with iPhone® and iOS®). The main application interface includes several user interfaces that will be displayed according to the data of the client devices to activate or not activate specific functions. The main application remains active on the server, and more precisely in the virtual space even when communication with the client device is interrupted, or when the client device being used changes. Finally, the main application can use all the features of the client devices. Indeed, since the user interface adapts to each of the client devices, they can allow for the specific functionalities of the client devices.

All these features allow applications to be developed and deployed much more quickly. This saves time and resources (energy consumption, memory and storage on the phone). The client device is mainly used to display data. As a result, the processor's resource consumption is greatly reduced. It automatically leads to an improvement in autonomy. Finally, the number of features may exceed the computing capacity of the client device on which the application would have had to be installed without the invention.

The invention also makes it possible to run an application on a remote server and have the output appear on a client application, to adapt the user interface to each different client device, while keeping the application active in the server, thanks to a virtual space that keeps the client application active in said virtual space regardless of whether the said client application is connected with the server. In this way, the invention makes it possible to keep each of the client applications launched in a virtual space in operation. This feature allows the simultaneous use of several different client devices with different user interfaces.

It also ensures that a session is never lost and offers perfect continuity between the devices and in the event of a disconnection from the server.

The virtual space of the invention is more than a simple link between the user interfaces stored on the server and the client applications. Indeed, the virtual space of the present invention is a complete virtual environment.

Moreover, this virtual space is necessary for simultaneous use of several clients at the same time.

A simultaneous management of several clients is therefore possible with the invention.

Thanks to the virtual space, the user interface does not have to be generated again each time the session is started. Indeed, user interfaces in the virtual space never stop working. Thus, there is no interface generation step each time a session is resumed. The interfaces are already generated and remain active in the server and more precisely in the virtual space. This allows the simultaneous and synchronized use of several devices simultaneously. This feature is only possible with the virtual space of the invention.

The invention also relates to the fact that the virtual space includes at least one data communication module, called namespace, allowing communication between the logic part of the main application and the panel space.

The creation of a namespace allows in particular to have a common base allowing especially synchronization between all the various user interfaces. This common base allows in particular the activation of a "follow me" function which, among other things, produces a synchronization of the display of all user interfaces on all the client devices. In addition, it is a way of stopping and resuming a session from any client device without losing data.

The invention also concerns a system implementation process, described above, in which the use of the at least one client application involves the following steps:
  transmission of usage data from a client device to the panel space through the interface selector,
  transmission of usage data from the panel space to the virtual space,
  transmission of usage data from the virtual space to the logic part,
  processing of the usage data by the logic part,
  transmission of usage data by the logic part to the virtual space with a status of processed data,
  transmission of data processed by the space to the panel space,
  transmission of the data processed by the panel space to the at least one client application.

This process allows the use of a main application on any type of client device. This is possible thanks to the processing of calculations in a logic part of the main application remote from the graphic part. Separation in this way saves on resources in terms of energy and computing power.

Finally, from another standpoint, the present invention concerns a computer program-product or a non-transitory media readable by a computer, including instructions, which, when performed by at least one processor, perform the steps of the process as per the invention mentioned above.

BRIEF DESCRIPTION OF THE FIGURES

Other characteristics, purposes and advantages of the present invention will appear from the reading of the detailed description below, and in relation to the annexed drawings given as non-exhaustive examples and on which:
FIG. 1a are a concrete illustration of the different panels and their correspondences according to the client devices.
FIG. 1a is an example on a smartphone, as well as the correspondence with a touchscreen tablet and/or a computer.

DETAILED DESCRIPTION

Before going into the details of preferred ways of making the invention with reference to drawings in particular, other optional features of the invention, which may be implemented in combination in any combination or in an alternative way, are indicated below:
  The panel space includes at least one user interface and an interface selector, so that each of the user interfaces corresponds to a client device type. Naturally, a user interface can also correspond to several types of client devices.
  the selection of the user interface to be displayed on the client application is made by the user interface selector on the basis of data transmitted to the selector by the client application.
  the data transmitted to the user interface selector are taken from the following characteristics of the client device on which the client application is installed: features of the client device, orientation of the client device in space, user interface theme of the client device, type of the client device, screen size of the client device, operating system of the client device, language and geolocation of the client device.
  each of the user interfaces includes several panels.
  the client application is configured to display only one panel at a time.
  each panel includes at least one widget such as action buttons and/or fields.

the at least one namespace includes at least one interaction object such as a field and/or a table and/or an action.

each of the panels is associated with a namespace.

each of the panels associated with a namespace is configured to receive and send data to the associated namespace through the activation of widgets and/or interaction objects.

a plurality of client devices is connected to a single user session, and wherein each change on one of the user interfaces is reflected in the other user interfaces displayed on the various client devices.

the activation of a widget on the panel displayed on the client device leads successively to at least the following actions:
 transmission to the corresponding panel in the panel space of data with a status of usage data;
 activation of the widget of the corresponding panel in the panel space,
 transmission of widget usage data to the associated namespace,
 activation of the namespace interaction object corresponding to the widget of the panel space,
 transmission of usage data to the main application from the namespace,
 processing of usage data by the main application and changing from a usage data status to a processed data status,
 returning the processed data to a namespace identical to or different from the one that transmitted the usage data from the main application in an interaction object,
 sending the processed data from the interaction object of a namespace to at least one corresponding widget in the panel space,
 sending the processed data from the at least one widget of the panel space to at least one client application.

a step between selecting the user interface in the panel space takes place between the step of transmitting the usage data to the corresponding panel in the panel space and the step of activating the widget of the corresponding panel space.

the virtual space includes several namespaces, in which a step of exchanging usage data and/or processed data between namespaces is performed.

a method comprising, prior to the step of activating a widget on the panel displayed on the client device, a step of connecting to a user session.

a step of sending the processed data from the interaction object of a namespace to at least one corresponding widget in the panel space, comprising the sending of processed data to several widgets, a step of step of sending processed data from the at least one widget of the panel space to at least one client application including sending the processed data to multiple client applications.

The main application is coded according to a first language.

There, at least one client application is coded according to a second language.

The first language and the second language are different.

The first and second language are identical.

The main application includes at least a graphic part and a logic part.

The logic part of the main application is hosted on at least one server.

The client device is chosen from one of the following devices: a computer, a touch tablet, a computer, a connected object such as a watch, glasses, clothes, bracelets, etc.

the usage data transmitted to the virtual space are taken from the following screen characteristics: their size and/or number of pixels and/or ratio and/or the presence or absence of an integrated pointing device.

The first language is Java.

The second language is taken from the following languages: Java, JavaScript, TypeScript (TS), Objective C, Swift, HTML, C, C++, C#/XAML, CSS.

A field is an empty space configured to be filled by the software or by a user.

A table consists of columns and rows, each cell of a table is considered as a field.

An action allows the activation of an operation in the logic and/or graphic part of the main application.

The application remains active in the virtual space when disconnecting at least one client application.

The application remains active in the virtual space when disconnecting from all client applications.

The virtual space is interposed between the graphic part and the logic part.

The graphic part includes the virtual space and the panel space.

For understanding the invention, the following definitions will apply:
 Widget: Basic element of the graphic interface of a software (window, toolbar, push button, fields for example).
 Fields: empty space configured to be filled by an object such as for example text and/or a link and/or an image.
 The term APP refers in the patent application and in particular on the drawings to the term application.
 The term UI refers in the patent application and in particular on the drawings to the User Interface.
 The term ID refers to the identification elements. For example, a user name and password for a user, or an internal number for an application.
 Application: software or set of software designed to process a specific task
 Platform: all the hardware and software features defining a device type.
 Multiplatform application: software or set of software designed to process a specific task and that can run on several platforms, i.e. on several types of devices.
 the at least one widget of the panels is configured to be associated with one of the at least one interaction object of at least one namespace to receive and send data to said associated namespace through the activation of the widgets and/or interaction objects.

The invention described below allows the development and deployment of multiplatform applications.

In particular, this invention implements a method for deploying and developing at least one main application 103. On completion of this method, the deployment of the main application 103 is faster and time is also saved during future updates, while data security is increased (very limited local storage of user data).

The invention includes in particular a system whereby a main application 103 is accessible to a plurality of platforms through at least one client application 201.

Advantageously, the invention will allow access to the main application 103 on all the platforms without additional development. Indeed, a developer wishing to make his main application 103 available on many different platforms only codes his main application 103 once in the system. The system then makes the said main application 103 accessible on all platforms. The same will apply to all updates of the main application 103. The update of the main application 103 within the system will then be available on all platforms.

The system implemented by the invention therefore includes at least one server 100 comprising at least one main application 103 and at least one client device 200 comprising a client application 201. The term client device 200 will be used for any type of device on which it is possible to install software and which can communicate with the server 100. Communication with the server 100 can use any type of means such as a wired network (Ethernet or optical fiber for example), a wireless radio network (Wi-Fi® or cellular, like 4G for example) or optical (Li-Fi for example). Generally and advantageously, the connection to the server 100 is made through an Internet network. Thus, client devices 200 can be computers (fixed or mobile), smartphones (Smartphone or Ordiphone), smart televisions or smart presentation devices, touch pads (digital tablet), connected glasses, connected watches or any other type of device for connection to the Internet and on which a client application 201 can be installed.

The client application 201 is an application that is partially coded in the native language of the client device 200 and installed on said client device 200. This client application 201 is preferably coded and deployed. In addition, the languages used to code the client application 201 are not necessarily among those of the main application 103. The goals and operations of the client application 201 will be developed below.

Advantageously, server 100 includes at least the main application 103, a panel space 110, a virtual space 120, and an interface selector 102.

Figure 2:
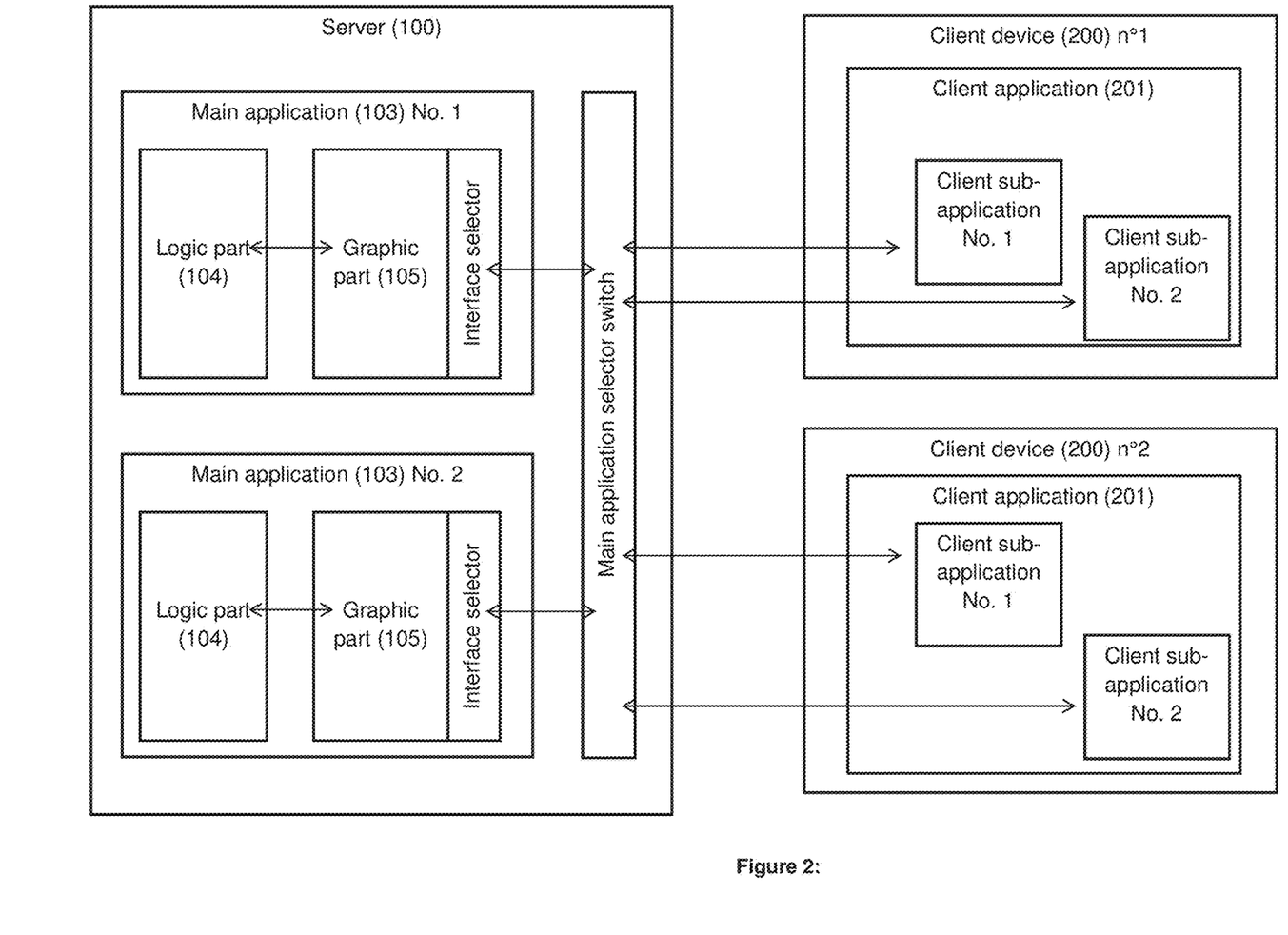
FIG. 2 is an overview of a system with several main applications.
Figure 3:
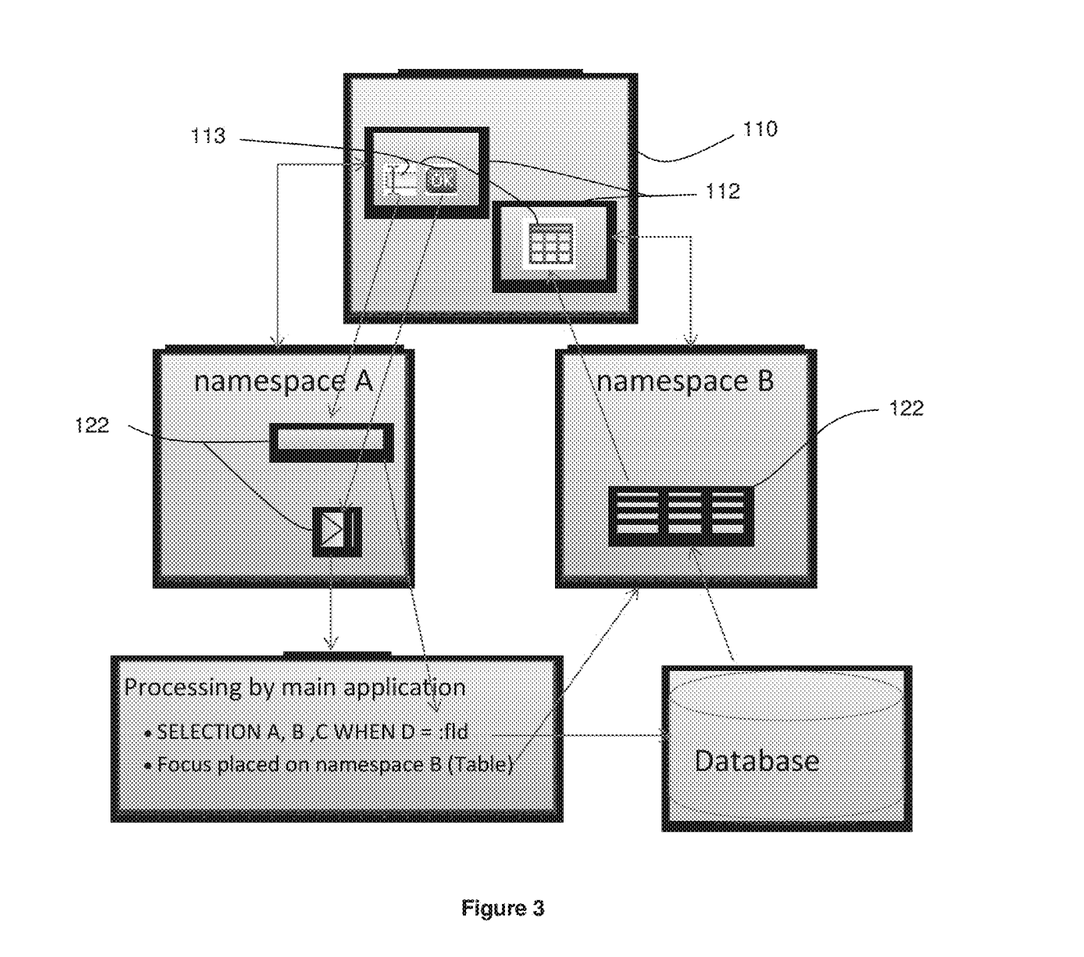
FIG. 3 depicts the interactions between the virtual space, the panel space and the logic part of the main application.

In one embodiment of the invention (FIG. 2), the server 100 includes several main applications 103 and only one client application 201 per client device 200. In this optional embodiment, the client application 201 is subdivided into client sub-applications. Advantageously, an application selector is then present to determine which main application 103 should be activated.

The Main Application 103

In the preferred embodiment of the invention, the main application 103 is the application coded by the developer. It is the application that must then be accessible on all platforms.

Advantageously the main application 103 includes a logic part 104, a graphic part 105 and a virtual space 120. Preferably, the logic part 104 and graphic part 105 of the main application 103 are separated. Advantageously, the graphic part 105 includes the panel space 110. In a non-preferential embodiment, the virtual space 120 is included in the graphic part 105. The logic part 104 is preferably not present in the panel space 110 and in the virtual space 120. In an alternative embodiment of the invention, specific elements of the logic part 104 are present in the panel space 110 and virtual space 120.

The logic part 104 preferably includes all the processes for data processing. This is the part of the system in which all the operations that the main application 103 can perform are described. The various management and control rules of the system are implemented in this part of the system.

The graphic part 105 includes all the widgets 113. This means all the basic elements of the application user interface 111. The graphic part 105 includes all the links between widgets 113 and logic part 104.

Advantageously the main application 103 can be distributed on a plurality of servers 100. In another embodiment, the main application 103 is hosted on a single server 100.

Preferably, the server 100 also includes a database. This database can store all the data necessary for the operation of the application, but also data about the use of the application. For example, usage data may include data on application connections, error rates, etc., but also data used to enrich the main application 103. For example, in a restaurant search application, the database will store contact data (location, e-mail, phone, etc.) of restaurants. Another embodiment of the invention also allows the main application 103 to recover data from external databases. For example, again in a restaurant search application, the main application 103 can search on the database of a third party for data on the location of a particular restaurant. None of these examples are exhaustive.

The data that flow between the client device 200 and the server 100 are advantageously secure. The security of this data also requires a precise security algorithm such as SSL/TLS.

Figure 4:
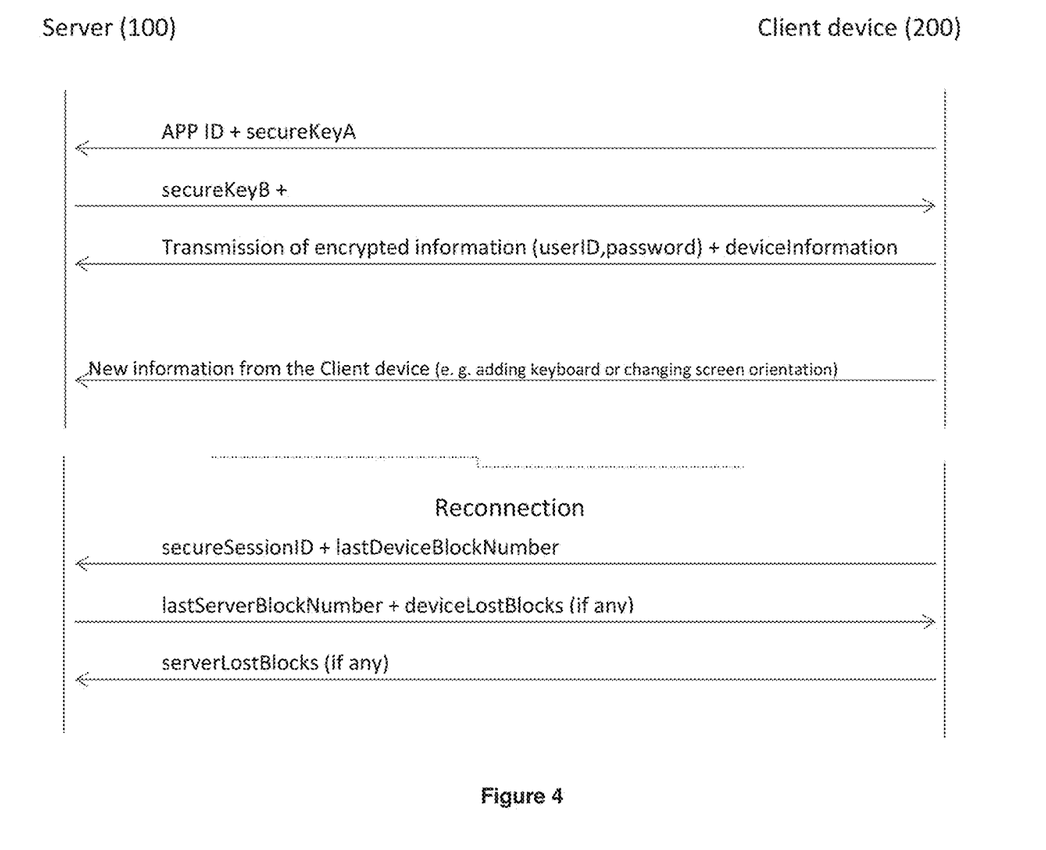
FIG. 4 shows the steps for logging in to a session, securing the data, and, in the event of disconnection and reconnection, the steps necessary for the said reconnection.

As illustrated in FIG. 4, the data security logic can be as follows:

The client device 200 sends its identifications (APP ID) and an encryption key A (secureKey A);

Server 100 responds by sending an encryption key B (secureKey B);

Once this double identification has been performed, the client device 200 sends the server 100 the user IDs (advantageously userID and password) as well as the usage data 300 of the client device 200 (deviceInformation) such as, for example, the orientation of the screen, its number of pixels, etc.

These different steps allow the user to connect to a user session. Since the main application 103 is hosted on a server 100, several people can use it together. Thus, an authentication of the client device 200 and the user with the server 100 allows the simultaneous use of several client applications 201 simultaneously with the main application 103.

In addition, a client application 201 can be present for several main applications 103. The identification of the client application 201 used with the server 100 is therefore an important step for the proper functioning of the system.

Once this authentication is done, the client device 200 can transmit, in an encrypted and authenticated form, any new data that the client device 200 or another client device 200 can transmit. In case of new connections of a new client device 200, an authentication of this client device 200 will of course be performed.

If a device is disconnected during a session, the second opening advantageously follows the following steps, again according to FIG. 4:

The client device 200 returns the identifiers used in the previous session in encrypted form (secureSessionID), as well as the last data packet sent by the client device 200 (lastDeviceBlockNumber). It is understood that the data travels as in any packet-based software.

In response, server 100 sends the last data packet it sent (lastServerBlockNumber) to client device 200, as well as missing packets if any (deviceLostBlocks (if any)), With this new data, the client device 200 can return, if any, the missing packets sent to server 100 (serverLostBlocks (if any)).

All these steps allow you to recover a session that has been cut off. This recovery is done without loss of data already transmitted with a high level of security.

The Panel Space 110

The main application 103 includes a virtual module for storing graphic interfaces called panel space 120. The module is characterized as being virtual because it is present in the main application 103. The panel space 110 is preferably hosted on the same server 100 as the main application 103. In an alternative embodiment, the virtual space 120 is hosted on a different server 100 than the one hosting the main application 103. The panel space 110 includes at least one user interface 111 (UI) and preferably a plurality of user interfaces 111. These user interfaces are then transmitted to the client devices for display. The correspondence between a client device 200 and the dedicated user interface 111 to be displayed is made by an interface selector 102 (described below in the description).

Advantageously, there are as many user interfaces as there are different types of client devices 200. In other words, for each different type of client device 200, a specific user interface 111 is created and stored in the panel space 110. To have a user interface 111s perfectly adapted to the characteristics of the client devices 200, each of the user interfaces 111 takes into consideration the said characteristics of the client devices. These include: features, orientation, user interface theme of the client device 200, screen size, device type and operating system of the device. It is evident that the number of user interfaces 111 stored in the panel space 110 can be very high. For example, a different user interface 111 must be used for an Android computer with a 6-inch than for an Android smartphone with a screen of less than 4 inches.

Advantageously, each of the user interfaces 111 also includes a plurality of panels 112. Preferably, the client device 200 will display only one panel 112 at a time. Thus, a panel 112 corresponds to what an end user sees on the screen of his client device 200.

Each of the panels 112 includes at least one widget 113. Preferably each panel includes several widgets 113.

A widget 113 can be an action button. It can also correspond to a field and/or table. It is understood that a table is an organized succession of fields. Advantageously, an action button is associated with an action. An action also allows the activation of an operation in the logic part 104 and/or graphic part 105 of the main application 103. This operation can for example be the search for a data, the display of a different panel 112 (thanks for example to a "back" button), the selection of a field, etc.

Depending on the actions of the end user, and/or the possibilities offered by the main application 103, several panels 112 are required to display all data and/or widgets 113. Thus, for example, in a bank account management application, the application home page corresponds to a first panel 112 integrating, for example, two widgets 113 corresponding to two fields for filling in the account login and password, and a third widget 113 corresponding to an activation button to send the input data and gain access the accounts. The account overview in this example corresponds to a second panel 112, the search for an operation on a third panel 112, and the display of the result of the search for an operation on a fourth panel 112. Other panels 112 are of course possible and complementary.

In addition, as mentioned previously, several user interfaces 111 were present for a main application 103. Each of the user interfaces 111 has its own number of panels 112. Similarly, the content of each panel 112 is also independent (number of widgets 113, type of widgets 113, etc.). Of course, when the main application 103 is created, a single panel 112 can be developed for all the user interfaces 111. However, in such a solution, the result would not be perfectly adapted to all client device 200 configurations.

It is easy to understand the interest of specializing for each of the user interfaces 111. Indeed, depending on the characteristics of the client device 200, the number of data displayed on the screen, or the functional features of the device, for example, may be different. Having an action button to take a picture makes no sense in a user interface 111 displayed on a client device 200 that does not have a camera. The same applies to the number of elements that can be displayed on a client device 200. This number depends directly on the size of the screen. It is obvious that the number of widgets 113 that can be displayed on a 2 m (meter) diagonal screen (TV screen for example) is not the same as for a 3 cm (centimeter) diagonal screen (watch screen for example). Of course, in the embodiment where all the user interfaces 111 include identical panels 112, a scaling of the various widgets 113/panels 112 can be performed to adapt to the characteristics of the screens of the client devices 200.

The Virtual Space 120

The main application 103 includes a virtual module for storing graphic interfaces called panel space 120. The module is characterized as being virtual because it is present in the main application 103. The virtual space 120 is also hosted on server 100. Advantageously, the virtual space 120 is hosted on the same server 100 that hosts the panel space 110. Other panels are of course possible and complementary. In an alternative embodiment, the main application 103 does not include a virtual space 120. Virtual space 120 is not essential to the operation of the invention.

The virtual space 120 allows a link between the logic part 104 and the panel space 110. The virtual space 120 also allows a link between the various user interfaces of the panel space 110, and more precisely between the various panels 112 within the same user interface 111 or not.

Figure 1:
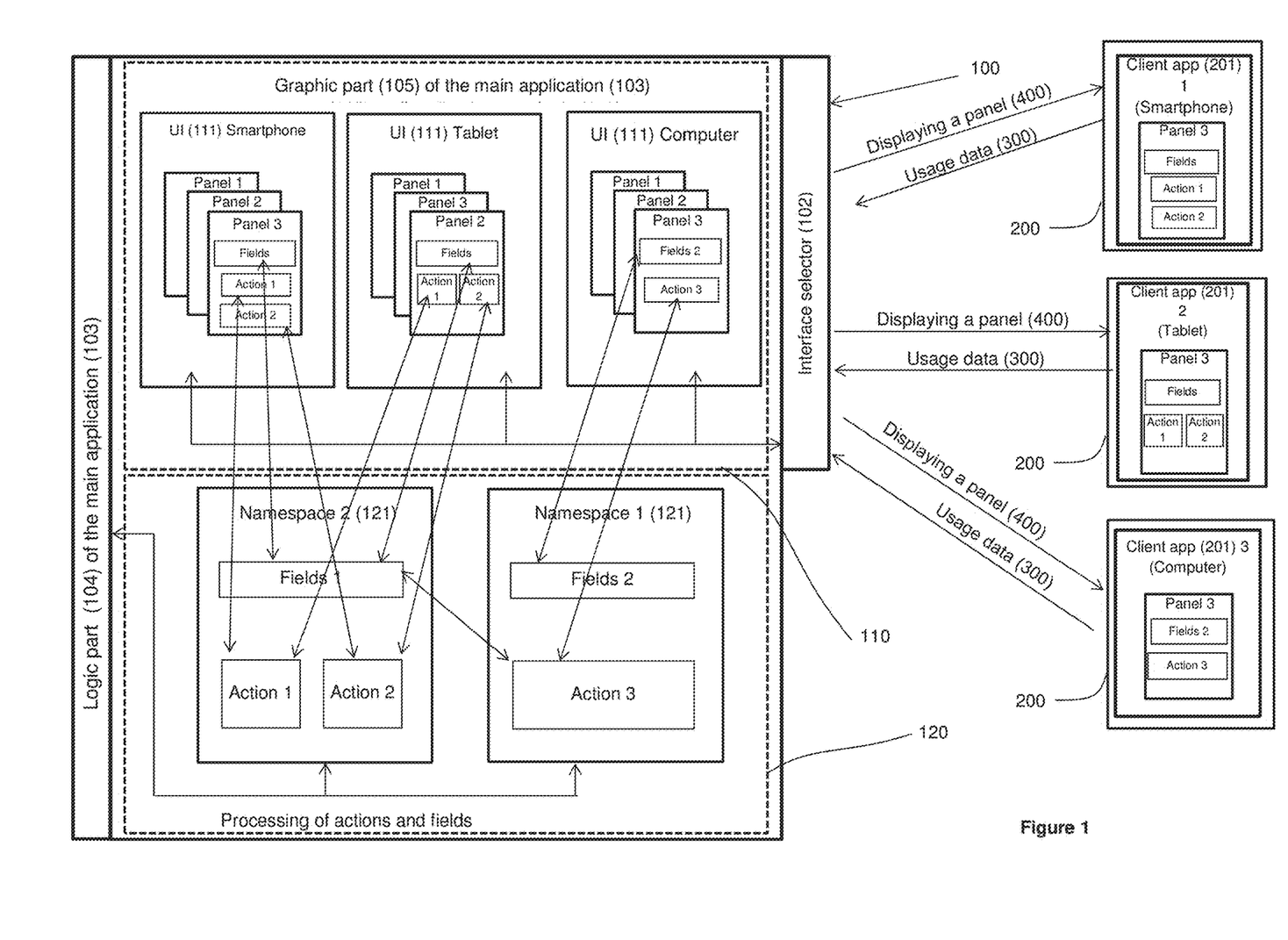
FIG. 1 is an overview of a system implementation.
Figure 1A:
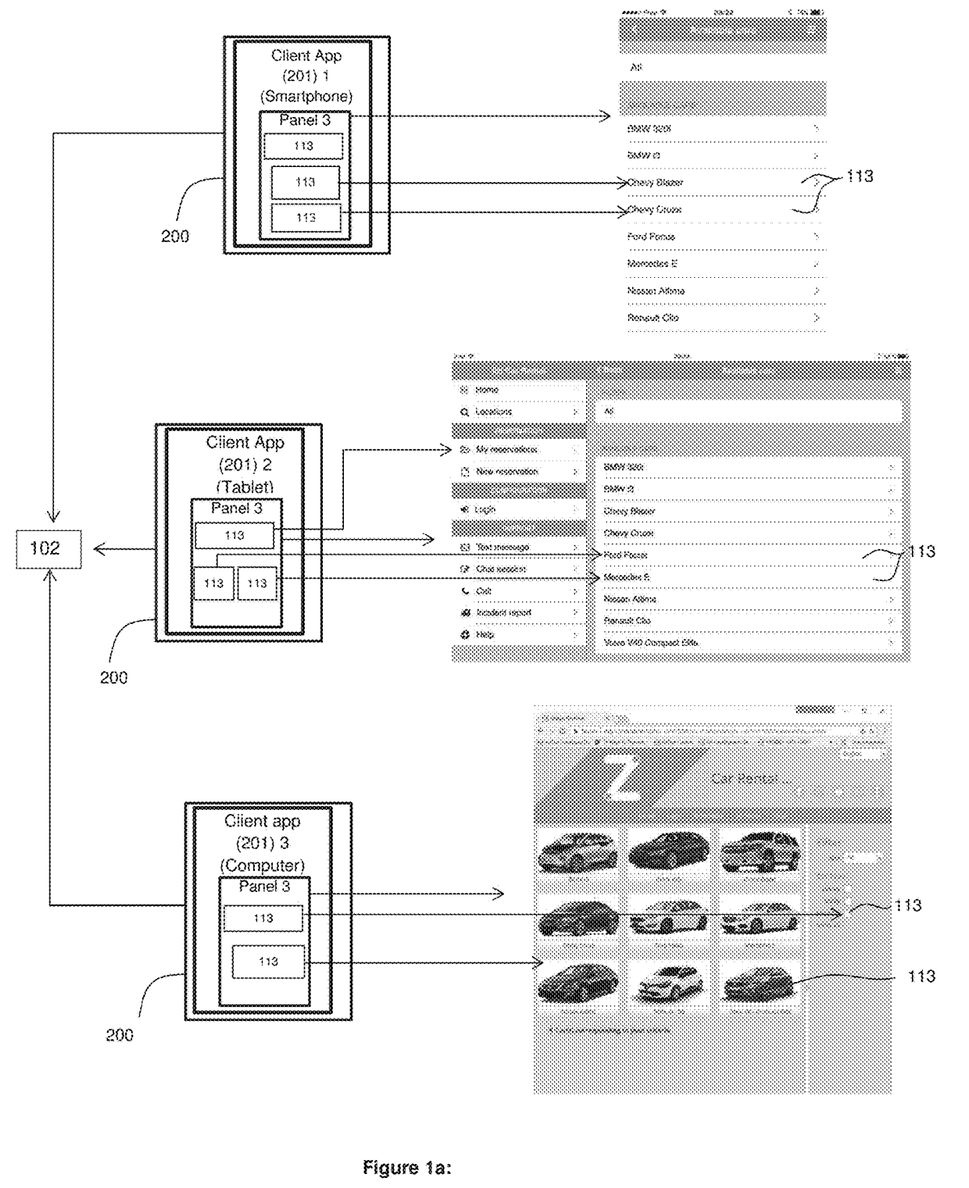

The virtual space 120 advantageously includes at least one namespace (NS) 121. A namespace 121 can be associated with several panels in panel space 110. Preferably, several namespaces 121 cannot be associated with a single panel 112. As mentioned above, these panels 112 may or may not be from the same user interface 111. A namespace 121 includes at least one interaction object 122. An interaction object 122 can be a filling field and/or a table and/or an action. Advantageously, the virtual space 120 includes only these three types of interaction objects 122. Advantageously, each interaction object 122 of a namespace corresponds to at least one widget 113 in the panel space 110. FIG. 1a shows a widget 113 when using the invention. Conversely, all the widgets 113 present in the panels 112 correspond to at least one interaction object 122 in the virtual space 120. In addition, interaction objects 122 of a namespace 121 can communicate with other interaction objects 122 of the same or of another namespace 121 and with a logic part 104 of the main application 103.

In other words, namespaces 121, and their interaction objects 122, are the common denominator between all panels 112 of the user interfaces 111 but also between widgets 113 and the logic part 104 of the main application 103.

Thus, activating an action in a widget 113, activates an interaction object 122. The activated interaction object 122 will on the one hand transmit the information of this activation for processing to the logic part 104 of the main application 103, and on the other hand send the information of this activation to all widgets 113 of the other panels 112 associated with this interaction object 122. In the end, the activation of a widget 113 in a given panel 112 corresponds virtually to the activation of all similar widgets 113 present in the other 112 panels.

The namespace 121, therefore, also serves to synchronize all panels 112 so that they all display common information.

More generally, the virtual space 120 allows the entire application to remain active. Thus, even when all client applications are disconnected, the application is still active in the virtual space 120. Regardless of the number of client sessions, they are all stored in the virtual space 120. In other words, an application is always active in virtual space 120, and preferably in the RAM memory of the server.

By keeping the application active in the virtual space 120 and in particular through the different namespaces 121, it allows perfect synchronization between the various client applications 201 in real time, but also the recovery of an entire activity on the client application 201 even after a break.

These elements differ fundamentally from the prior art in that the application remains active in a virtual space 120 which is not the case in the prior art as for example in US2006/179118. In this prior art as in all other prior arts, panel space 110 and virtual space 120 are merged and include an interface selector to specify the interface to be used according to the client application 201. However, the invention described here is fundamentally different in that panel space 110 and virtual space 120 are dissociated. This allows several client applications 201 to be used simultaneously on the same application. Other prior arts, such as filling in a form on a website, cannot keep in memory all the sessions of the active client applications 201. Thus, in case of connection failure, the forms must be filled in again, or if this is not the case because there is a local cache, there cannot be any synchronization between the various client applications.

The virtual space 120 while offering a way of maintaining the activation of the application even without a connected client application 201, and preferably separated virtually from the graphic part 105 of the main application 103 is unique and allows easy use of the main application 103 on the client applications 201.

In FIG. 1*a* which discloses an example of different panels 111 there are widgets 113, specifically designated in the figure by car models. This type of widgets associated with car models is of course not restrictive, and should only be interpreted as an example.

In this FIG. 1*a*, it is the virtual space 120 that allows the synchronization of all the actions between the various interfaces. Thus, for example, if field 2 of the computer interface is selected to sort cars, then this sorting applies to all the panels 111, even if for some panels 111, the sorting option was not available. This is possible thanks to the virtual space 120 and the correspondence in the virtual space 120 made between the widgets 113 and the interaction objects 122 of the namespaces 121.

Unlike the prior art, in which user interactions on the client application, called an "event" and linked to a specific piece of code, trigger the application of said code in the logic part 104. This then requires, in the prior art, a very great diversity of widgets 113 and a volatility of the piece of code attached to the event. Indeed, each widget 113 present in the client application 201 must have its own development and therefore its own code. Thus, in case of loss of connection with the client application 201, the code disappears because it is stored only in the graphic part 105 of the client application. It is therefore extremely volatile.

In the invention, the events are linked to a piece of code in virtual space 120, and therefore only in one of the types of interaction objects 122 present in virtual space 120. Advantageously, the virtual space 120 acts as a common denominator between all client applications 201 and the logic part 104. Thus, all the events are stored in the virtual space 120 and independent of the client application and its connection to the main application 103. This makes it easier to develop client applications 201, to make more client devices 200 compatible and to keep the piece of code related to the event in case of a connection failure between the main application 103 and the client application 201.

Advantageously, and in combination with any of the achievements, an event-related code, i.e. an action taken by a user on the client application, is stored in a non-volatile manner, i.e. it does not disappear in the event of a connection failure between the client application 201 and the logic part 104.

Activating an interaction object 122 in a namespace 121 can notably send data for processing to the logic part 104 of the main application 103, modify the panel 112 to be displayed (step of displaying a panel 400) in the user interface 111, and create a temporary namespace 121 to display the data from the processing by the logic part 104 of the main application 103.

Advantageously, when a namespace 121 is selected, and more precisely an interaction object 122 in namespace 121, we refer to a namespace 121 focus. The term focus advantageously refers to focusing. Thus, the logic application will interact with an interaction object 112 focused in namespace 121.

The Interface Selector 102

The selection of the user interface version 111 corresponding to the client device 200 is made by the interface selector 102 according to usage data 300 (deviceInformation). The usage data 300 includes hardware (e. g. screen size), software (e.g. operating system) and usage data (e.g. user selection). The usage data 300 is transmitted to the interface selector 102 by the client application 201. Advantageously, the usage data 300 transmitted to the interface selector 102 is taken from the following characteristics of the client device 200 on which the client application 201 is installed: features, orientation, user interface theme of the client device 200, screen size, device type and operating system of the device.

Thus, the functional features of the device include the presence of: a battery and, where applicable, the status of the battery, a device for recording video and/or photographs such as a camera or a camcorder, a contact book, a compass, a GPS, a sound recording device such as a microphone, a motion sensor device such as an accelerometer or gyroscope, an external pointing device such as a mouse or a stylus, an internal pointing device such as a touchscreen, a multimedia player allowing sound and/or video playback, a device allowing sound to be emitted such as a loudspeaker, an antenna allowing waves such as radio or telephone waves to be emitted and received, a voice recognition system, or the presence of a fingerprint reader, etc. This feature list is not exhaustive and the device may have other features.

The orientation data of the device includes the position of the camera (landscape or portrait).

The interface theme includes the presence of 3D elements (such as for example for iOS® 4 to 6, Mac OSX® or Windows 7® and later), the presence of bright themes (for iOS® for example) or the presence of dark themes (Android® or Windows Phone®), the presence of flat design (such as for iOS 7 and later, Android 4 and later, Windows Phone, Windows 8 and later), etc.

The type of device is advantageously taken from the following devices: desktop (stationary desktop), laptop (portable computer), glasses, very small devices (e.g. connected watches), telephone (preferably smartphone), presentation device (e.g. projector or television), touchscreen slate (or touchscreen tablet). Identification of the device type can be performed by analyzing the serial number, or screen capabilities such as size, ratio, number of pixels, presence or not of an integrated pointing device (touchscreen), operating system, etc.

The device's operating system includes one of the following operating systems: Android (touchscreen tablet and smartphone), Blackberry OS, Windows, Desktop web browser (Chrome, Safari, Opera, Internet Explorer, Edge, Mozilla Firefox, etc.), iOS (touchscreen tablet or smartphone).

Finally, the data concerning the size of the screens are preferably grouped into value spaces. For example, there are touchscreen mini-tablets (size between 7 and 9 inches), large smartphones (from 6 inches up), normal smartphones (between 4 and 6 inches), small smartphones (less than 4 inches), touchscreen tablets (from 9 inches up).

Other data can be used, such as the language of the client device 200 or the geographic location of the client device 200. Depending on these elements, a user interface 111 may or may not display certain contents (e.g. limitation of nudity content display for Arab countries). The main application 103 can therefore be easily adapted to all local laws.

In addition, for Arabic and/or Asian languages, the reading direction may be different. This requires displaying the user interfaces 111 in different ways to facilitate the use of the main application 103.

The interface selector 102 can also collect data on whether or not parental control is in application, for example. It is understood here that user interfaces 111 will then mask violent and/or pornographic content for example.

An interface selector 102 can of course be based on one or all or a selection of these data. Finally, other data can be used advantageously to select a user interface 111.

In a preferred embodiment of the invention, the data between the main application 103 and the client application 201 always passes through the interface selector 102 before being displayed in the client application 201. In an alternative embodiment of the invention, the data from the client application 201 passes through the interface selector 102 before corresponding to a user interface 111, but the data from the main application 103 to the client application 201 is directly transmitted through the user interfaces 111 without passing through the interface selector 102.

The interface selector 102 is specifically designed to match a widget 113 of the client application 201 with the corresponding widget 113 of the user interface 111 stored in panel space 110.

The Client Application 201

The client application 201 is installed on the client device 200. Advantageously, the coding and installation of the client application 201 is performed before the coding of the main application 103. Moreover, the client application 201 is advantageously coded only once, regardless of the number of main applications that are then deployed.

Advantageously, the client application 201 allows the display of the user interface 111 of the main application 103 remotely on at least one client device 200. In a specific embodiment of the invention, the client application 201 includes a plurality of sub-applications corresponding to several main applications. Thus, for example, when opening the client application 201, the user must select the main application 103.

Advantageously the client application 201 is coded in a language taken from the following languages: Java, JavaScript, TypeScript (TS), Objective C, Swift, HTML, C, C++, C#/XAML, CSS. The selection of the code language of the client application 201 depends directly on the client device 200 on which the client application 201 is to be installed. The language of the client application 201 may or may not be a language similar to that of the main application 103.

In another embodiment of the invention, the client application 201 is a web browser such as Chrome, Safari, Opera, Internet Explorer, Edge, Mozilla Firefox, Safari Mobile etc.

Using the System

Now that we have described all the elements of the system, we will describe how it works, in particular the deployment of a main application 103 and its use.

Deploying a Main Application 103

When developing a main application 103, the client applications 201 are advantageously already created and preinstalled on the client devices. The developer will only code his main application 103 on a server 100 in a programming language compatible with server 100. Advantageously, the language used to code the main application 103 is Java® and/or JavaScript. During application development, the developer will separate the logic part 104 and the graphic part 105 of the application. In the graphic part 105, it will mean creating a plurality of panels 112 containing all the widgets 113 available and necessary for the use of the invention. The panels 112 are then grouped into user interfaces 111. Each of the user interfaces 111 is then associated with a user data set 300.

The developer will also create a virtual space separate from the logic part 104 and the graphic part 103. This virtual space will be completed with one or more namespaces 121. When creating a namespace 121, the developer will have to create one or more interaction objects 122 and associate them, either with a widget 113 or with another interaction object 122. In addition, the interaction object 122 can be associated with processing in the logic part 104 of the main application 103.

Advantageously, when the client application 201 is opened for the first time, it will transmit the usage data 300 from the client device 200 to the interface selector 102. This data can also be transmitted during exchanges between the client application 201 and the main application 103. Depending on the usage data 300 received, the interface selector 102 will match a user interface 111 with the client device 200. Advantageously, a copy of the first panel 112 of the selected user interface 111 is then sent to the client device 200 (via the interface selector 102 or directly via the panel space 110). Thus, at each moment "T", there is synchronization between the panel 112 selected in a user interface 111 and what is displayed in the client application 201 of the client device 200.

Application Use

Activating a widget 113 in the client application 201 automatically activates the corresponding widget 113 in the user interface 111. This activation is enabled by sending the necessary usage data 300 to the interface selector 102, which then matches the widget 113 displayed on the screen with the widget 113 present in a user interface 111.

Activating a widget 113 in panel space 110 automatically activates the associated interaction object 122 in a namespace 121 in virtual space 120. The activation of the associated interaction object 122 has several consequences depending on the interaction object 122 and the associated actions. This can lead to processing in logic application 104 and/or selection of another interaction object 122 and/or creation of a specific namespace 121. On the other hand, if other 113 widgets are associated with the associated 122 interaction object, then they are virtually considered enabled. The result of activating an interaction object 122 is then forwarded to all the 113 widgets associated with this object. All these widgets 113 will then be displayed in the client applications 103 associated with them. Of course, once activated, the application remains active in the virtual space 120, even if there are no more client applications 201 connected.

To illustrate our point, we will take the example of using a main application 103 for bank account management. Of course, the invention is not limited to the use of such an application. In addition, in our example, three client devices 200 are connected to the same session. The client devices 200 are advantageously a smartphone, a touchscreen tablet and a laptop. The user accesses the client application 201 from his computer. The information about the opening of the client application 201 is transmitted to the interface selector 102 with the smartphone usage data 300. The interface selector 102, using the data at its disposal, matches a user interface 111 with the device. Once the user interface 111 is selected, it selects the first panel 112 to be displayed. This selection of panels 112 activates an interaction object 122 in an associated namespace 121. The selection of an interaction object 122 is thus transmitted to all user interfaces 111, so that they select all their first panels 112. All these panels 112 are transmitted to the interface selector 102 which distributes them to the associated client devices 200.

The first panel 112 advantageously displays three widgets 113 (two fields to be filled in corresponding to logins and passwords, and an action button to send data). When the user fills out a widget 113 on his smartphone, this data is preferably transmitted in real time to the interface selector 102. The latter forwards this data to the corresponding user interface 111 in panel space 110. This interface then transmits the data to the interaction object 122 of namespace 121 which transmits them to all the associated widgets 113 in the various user interfaces 111. The user interfaces 111 are displayed on the connected client devices 200 using the interface selector 102. Thus, the filling in of a field on the smartphone is reflected in real time on the touchscreen tablet and on the laptop.

All the following actions repeat essentially the same steps. However, some differences may appear, such as the processing of data in the logic part 104 of the main application 103 or the creation of a namespace 121 to display a processing result by the main application 103.

For some specific actions, the action is processed directly between the user interface 111 and the client application 201. This is particularly the case for taking a photograph. Since the action is performed on the client device 200, there is no processing in namespace 121.

The synchronization of all user interfaces 111 on client devices 200 is a particularly important point of the invention. Indeed, the main application 103 remains active and the same user can change without affecting client devices 200. This is possible thanks to the focus of namespace 121 and more generally thanks to the fact that the application remains active in virtual space 120. This function, which can be called notably "Follow-Me", makes it possible to make the main application universal both in its development and in its use. What is more, this function also allows you to change languages without difficulty, for example. Indeed, the selection of a widget 113 of an interface 111 allows the activation, according to the procedure described above, of all the corresponding widgets 113 on the other user interfaces 111, and therefore its display on all client devices 200. Thus, the selection of a widget 113 in a specific language also appears on user interfaces 111 displaying other languages. One of the uses can therefore be simplified working between several collaborators connected to the same user session.

The invention is not limited to the previously described embodiments but extends to all the embodiments in the same spirit.

REFERENCE

- 100. Server
- 102. Interface selector
- 103. Main application
- 104. logic part
- 105. Graphic part
- 110. Panel space
- 111. User interface
- 112. Panels
- 113. Widget
- 120. Virtual space
- 121. Namespace
- 122. Interaction object
- 200. Client device
- 201. Client application
- 300. usage data
- 400. Displaying a panel

The invention claimed is:

1. A system for the creation and deployment of applications on several types of client devices, including at least one client application hosted on at least one client device, and a server hosting at least one main application, the main application comprising at least a logic part and a graphic part and a virtual module for storing at least one user interface designated as panel space, characterized in that the main application comprises an interface selector configured to match a user interface type to each client device type and a virtual graphic interface management module designated as virtual space, the virtual space:
   - comprising at least one data communication module, called namespace,
   - is configured to allow communication between the logic part of the main application and the graphic part,
   - is configured to permanently store the activation status of the main application following changes ordered by at least one of the client applications,
   the system being configured to perform at least the following steps in response to an activation of the at least one client application, these steps being performed by at least one microprocessor:
   - to receive from the client device via the interface selector the usage data,
   - to transmit the usage data to the panel space,
   - to transmit from the panel space the usage data to the virtual space,
   - to send the usage data from the virtual space to the logic part,
   - to have the logic part process the usage data,
   - to transmit from the logic part the processed usage data to the virtual space,
   - to transmit from the virtual space the processed usage data to the panel space, to transmit the processed data from the panel space to the at least one client application.

2. The system according to claim 1, configured so that the selection of the user interface to be displayed on the client application is made by the user interface selector on the basis of data transmitted to the selector by the client application.

3. The system according to claim 1, in which the data transmitted to the user interface selector are taken from the following characteristics of the client device on which the client application is installed: features of the client device, orientation of the client device in space, user interface theme of the client device, type of client device, screen size of the client device, operating system of the client device, language and geolocation of the client device.

4. The system according to claim 1, in which each of the user interfaces includes several panels, and preferably in which the client application is configured to display only one panel at a time.

5. The system according to claim 1, in which each panel includes at least one widget such as action buttons and/or fields.

6. The system according to claim 1, in which the at least one namespace includes at least one interaction object such as a field and/or a table and/or an action.

7. The system according to claim 1, in that the at least one widget of the panels is configured to be associated with one of the at least one interaction objects of at least one namespace to receive and send data to the associated namespace through the activation of the widgets and/or interaction objects.

8. The system according to claim 1, comprising a plurality of client devices displaying at least one user interface in which a plurality of client devices are connected to a single user session, and in which each change on one of the user interfaces is reflected on the other user interfaces displayed on the different client devices.

9. The method of implementing the system according to claim 1,
wherein the activation of at least one client application involves the following steps:
transmission of usage data from a client device to the panel space through the interface selector,
transmission of usage data from the panel space to the virtual space,
transmission of usage data from the virtual space to the logic part,
processing of the usage data by the logic part,
transmission of the usage data by the logic part to the virtual space with a status of processed data,
transmission of data processed by the virtual space to the panel space,
transmission of the data processed by the panel space to the at least one client application.

10. The method of implementing the system according to claim 1, in which the activation of a widget on the panel displayed on the client device leads successively to at least the following actions:
data transmission with a usage data status to the corresponding panel in the panel space;
activation of the widget of the corresponding panel in the panel space,
transmission of usage data from the widget to the associated namespace in the virtual space,
activation of the namespace interaction object corresponding to the widget of the panel space,
transmission of usage data to the main application from the namespace,
processing of usage data by the main application and changing from a usage data status to a processed data status,
returning the processed data to a namespace identical to or different from the one that transmitted the usage data from the main application in an interaction object,
sending the processed data from the interaction object of a namespace to at least one corresponding widget in the panel space,
sending the processed data from the at least one widget of the panel space to at least one client application.

11. The method of implementing the system according to claim 1, in which the virtual space includes several namespaces, in which a step of exchanging usage data and/or processed data between namespaces is performed.

12. The method of implementing the system according to claim 1, prior to the step of activating a widget on the panel displayed on the client device, a step of connecting to a user session.

13. The method of implementing the system according to claim 1, wherein the step of sending the processed data from the interaction object of a namespace to at least one corresponding widget in the panel space, comprises sending the processed data to several corresponding widgets.

14. The method of implementing the system according to claim 1, wherein the step of sending processed data from the at least one widget of the panel space to at least one client application includes sending the processed data to multiple client applications.

15. A computer program product comprising instructions, which when performed by at least one processor, performs at least the steps implemented in the system according to claim 1.

* * * * *